(12) United States Patent
Andrade Silva et al.

(10) Patent No.: US 10,324,971 B2
(45) Date of Patent: Jun. 18, 2019

(54) METHOD FOR CLASSIFYING A NEW INSTANCE

(71) Applicant: NEC Corporation, Tokyo (JP)

(72) Inventors: Daniel Georg Andrade Silva, Tokyo (JP); Hironori Mizuguchi, Tokyo (JP); Kai Ishikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 359 days.

(21) Appl. No.: 15/318,853

(22) PCT Filed: Jun. 20, 2014

(86) PCT No.: PCT/JP2014/067090
§ 371 (c)(1),
(2) Date: Dec. 14, 2016

(87) PCT Pub. No.: WO2015/194052
PCT Pub. Date: Dec. 23, 2015

(65) Prior Publication Data
US 2017/0116332 A1    Apr. 27, 2017

(51) Int. Cl.
*G06F 17/30* (2006.01)
*G06F 16/35* (2019.01)
(Continued)

(52) U.S. Cl.
CPC ............ *G06F 16/353* (2019.01); *G06F 16/93* (2019.01); *G06N 7/005* (2013.01); *G06N 20/00* (2019.01)

(58) Field of Classification Search
CPC ....... G06F 16/353; G06F 16/93; G06N 20/00; G06N 7/005
See application file for complete search history.

(56) References Cited

U.S. PATENT DOCUMENTS

2004/0249628 A1* 12/2004 Chelba ................ G06F 17/2715
704/4
2008/0082352 A1*  4/2008 Schmidtler ............ G06Q 10/10
705/2
(Continued)

FOREIGN PATENT DOCUMENTS

EP          1484745 A1    12/2004
JP       2004-362584 A    12/2004
JP       2010-108265 A     5/2010

OTHER PUBLICATIONS

Steven M. Beitzel et al., "Automatic Web Query Classification Using Labeled and Unlabeled Training Data", ACM, pp. 1-2 (Year: 2005).*

(Continued)

*Primary Examiner* — Jared M Bibbee
(74) *Attorney, Agent, or Firm* — Wilmer Cutler Pickering Hale and Dorr LLP (57) ABSTRACT

A method for classifying a new instance including a text document by using training instances with class including labeled data and zero or more training instances with class including unlabeled data, comprising: estimating a word distribution for each class by using the labeled data and the unlabeled data; estimating a background distribution and a degree of interpolation between the background distribution and the word distribution by using the labeled data and the unlabeled data; calculating two probabilities for that the word generated from the word distribution and the word generated from the background distribution; combining the two probabilities by using the interpolation; combining the resulting probabilities of all words to estimate a document probability for the class that indicates the document is generated from the class; and classifying the new instance as a class for which the document probability is the highest.

5 Claims, 4 Drawing Sheets

(51) Int. Cl.
 *G06N 20/00* (2019.01)
 *G06F 16/93* (2019.01)
 *G06N 7/00* (2006.01)

(56) References Cited

U.S. PATENT DOCUMENTS

| | | | | |
|---|---|---|---|---|
| 2008/0086433 A1* | 4/2008 | Schmidtler | ............ | G06N 20/00 706/12 |
| 2008/0097936 A1* | 4/2008 | Schmidtler | ............ | G06N 20/00 706/12 |
| 2010/0153318 A1* | 6/2010 | Branavan | ................ | G06F 16/35 706/12 |
| 2011/0119050 A1* | 5/2011 | Deschacht | ............ | G06F 17/271 704/9 |
| 2012/0078969 A1* | 3/2012 | Ananthanarayanan | ...................... | G06F 16/355 707/798 |
| 2013/0346346 A1* | 12/2013 | Criminisi | ............... | G06N 7/005 706/12 |
| 2014/0122381 A1* | 5/2014 | Nowozin | ............... | G06N 20/00 706/12 |

OTHER PUBLICATIONS

Rayid Ghani, "Combining labeled and unlabeled data for text classification with a large number of categories", IEEE, pp. 1-2 (Year: 2001).*

Jean-Noel Vittaut et al., "Learning Classification with Both Labeled and Unlabeled Data", pp. 1-12 (Year: 2002).*
Lili Yang et al., "Combining Lexical and Semantic Features for Short Text Classification", pp. 1-9 (Year: 2013).*
Chao Xing et al., "Document Classification with Distributions of Word Vectors", pp. 1-5 (Year: 2014).*
International Search Report corresponding to PCT/JP2014/067090 dated Sep. 22, 2014 (3 pages).
Jason D. M. Rennie et al., Tackling the Poor Assumptions of Naive Bayes Text Classifiers. Proceedings of the Twentieth International Conference on Machine Learning (ICML-2003), Washington DC, 2003; (8 pages).
Nigam, K., Mccallum, A.K., Thrun, S. et al. Text Classification from Labeled and Unlabeled Documents using EM. Machine Learning (2000) 39: 103; (pp. 103-134).
Jie Cheng and Russell Greiner, 1999, Comparing Bayesian network classifiers. In Proceedings of the Fifteenth conference on Uncertainty in artificial intelligence (UAI'99), Kathryn B. Laskey and Henri Prade (Eds.). Morgan Kaufmann Publishers Inc., San Francisco, CA, USA, ISBN:1-55860-614-9 (pp. 101-108).
Komiya et al, Negation Naive Bayes for Text Classification, Journal of Natural Language Processing, vol. 20 (2013) No. 2 p. (pp. 161-182).
Fujino et al, Optimal combination of labeled and unlabeled data for semi-supervised classification, IEICE Technical Report, Feb. 17, 2005, vol. 104 No. 669, (pp. 19-24).

* cited by examiner

METHOD FOR CLASSIFYING A NEW INSTANCE

TECHNICAL FIELD

The present invention relates to a classification method that determines the class of a new data instance (e.g. a text document) using a naive Bayes classifier.

BACKGROUND ART

The naive Bayes classifier is still a popular method for classification, especially in text classification where it often performs at par with the Support Vector Machines (SVM)-classifier (see Non-Patent Document 1). One advantage of the naive Bayes classifier is that it has the interpretation of a generative model that can be easily extended to model more complex relations (e.g. see Non-Patent Document 3).

In order to learn a naive Bayes classifier, for each class z, we determine the distribution of words that occur in documents belonging to class z. Let us denote the word distribution for class z as $\theta_z$, and the probability for a specific word w in class z, as $\theta_{w|z}$. Often this distribution is modeled by a Multinomial distribution. In order to classifying a new text, the probability of class z given the new text is calculated by multiplying the probabilities $\theta_{w|z}$ for each word w in the new document.

Note that naive Bayes classifier estimates the probabilities $\theta_{w|z}$ using only the training data instances (instances with known class). However, words like "I", or "the", that occur often in many documents, independent of the class, often introduced noise, and this way the estimates of $\theta_{w|z}$ get unreliable. One approach is to use a stop-word list to filter out such words. However, such a stop-word list is static and depends on the domain of the documents. Another approach is to weight the words by their inverse-document frequency, as suggested, for example, in Non-Patent Document 1. However, when assigning these weights the interpretation of the naive Bayes classifier as a generative model is lost. As a consequence, the weights and the interaction with parameters of the naive Bayes classifier cannot be learned jointly. Therefore, the weights are either fixed, or must be tuned using part of the training data (for example by using cross-validation).

Another line of research tries to improve classification accuracy, by additionally using instances (e.g. text documents) for which the class is not known. In contrast to training data instances (instances with known class), such additional instances are often available at large quantities. For example, in contrast to a few newspaper articles that are manually annotated with a class (e.g. whether the article is about "Animals" or about "Computer"), there is a vast amount newspaper articles for which not such class information is available (unlabeled instances). Such an approach to learn a classifier is often referred to as "semi-supervised". The method in Non-Patent Document 2 describes such a semi-supervised approach that can improve the estimation of the probabilities $\theta_{w|z}$ by using unlabeled instances. Using the Expectation Maximization (EM)-algorithm to assign class probabilities to unlabeled instances, they are able to estimate $\theta_{w|z}$ for words w that occur in the unlabeled corpus, but do not occur in the training data. However, their approach does not provide a solution to the problem of high-frequent words.

DOCUMENTS OF THE PRIOR ART

[Non-Patent Document 1] Tackling the poor assumptions of naive Bayes text classifiers, ICML, 2003.

[Non-Patent Document 2] Text classification from labeled and unlabeled documents using EM, Machine learning, 2000.

[Non-Patent Document 3] Comparing Bayesian network classifiers, UAI, 1999

SUMMARY OF INVENTION

Technical Problem

The naive Bayes model is not able to down-weight high frequent words like "I" or "the" that are often irrelevant for determining the class of document. However, due to the small sample of training data instances, theses irrelevant words might by chance occur more often in one class, than the other. As a consequence, for high-frequent words the probabilities $\theta_{w|z}$ are not spread evenly over all classes z, and thus some documents are wrongly classified due to the presence of high-frequent words.

Solution to Problem

To overcome the above problem, we propose an extended generative model of the naive Bayes classifier. The extended model introduces a background distribution $\gamma$ which is set to the frequency distribution of the words in the whole corpus. The whole corpus includes the training data, and can additionally include all other instances for which no class information is available. The proposed model allows that any word in the document is either sampled from the distribution $\theta_z$ defined by its class z, or from the background distribution $\gamma$. As a result, the proposed model allows that, especially high-frequent words, are explained by the background distribution $\gamma$ rather than by any distribution $\theta_z$. In order to decide whether a word is sampled from the distribution $\theta_z$ or from the distribution $\gamma$, we introduce a binary indicator variable d, one for each word in the document. The prior probability for the parameter d controls how likely it is that a word is sampled from $\gamma$ and this way controls the impact of high-frequent words on the classification result. The formulation as a generative model allows us to learn this prior probability efficiently using all instances (labeled and unlabeled), and thus, it is not needed to manually tune this prior probability.

Advantageous Effects of Invention

The present invention has the effect of reducing the impact of high frequent words on the classification result of a naive Bayes classifier. High frequent words often tend to be less informative than middle or low frequent words. The proposed method takes this into account, by explaining the high frequent words by a background distribution (word frequency distribution of whole corpus), rather than the word distribution of any individual class. The proposed method extends the generative model of the naive Bayes classifier, and the additional parameters can be learned from unlabled data (i.e., no need for cross-validation or additional training data).

DESCRIPTION OF EMBODIMENTS

Figure 1:
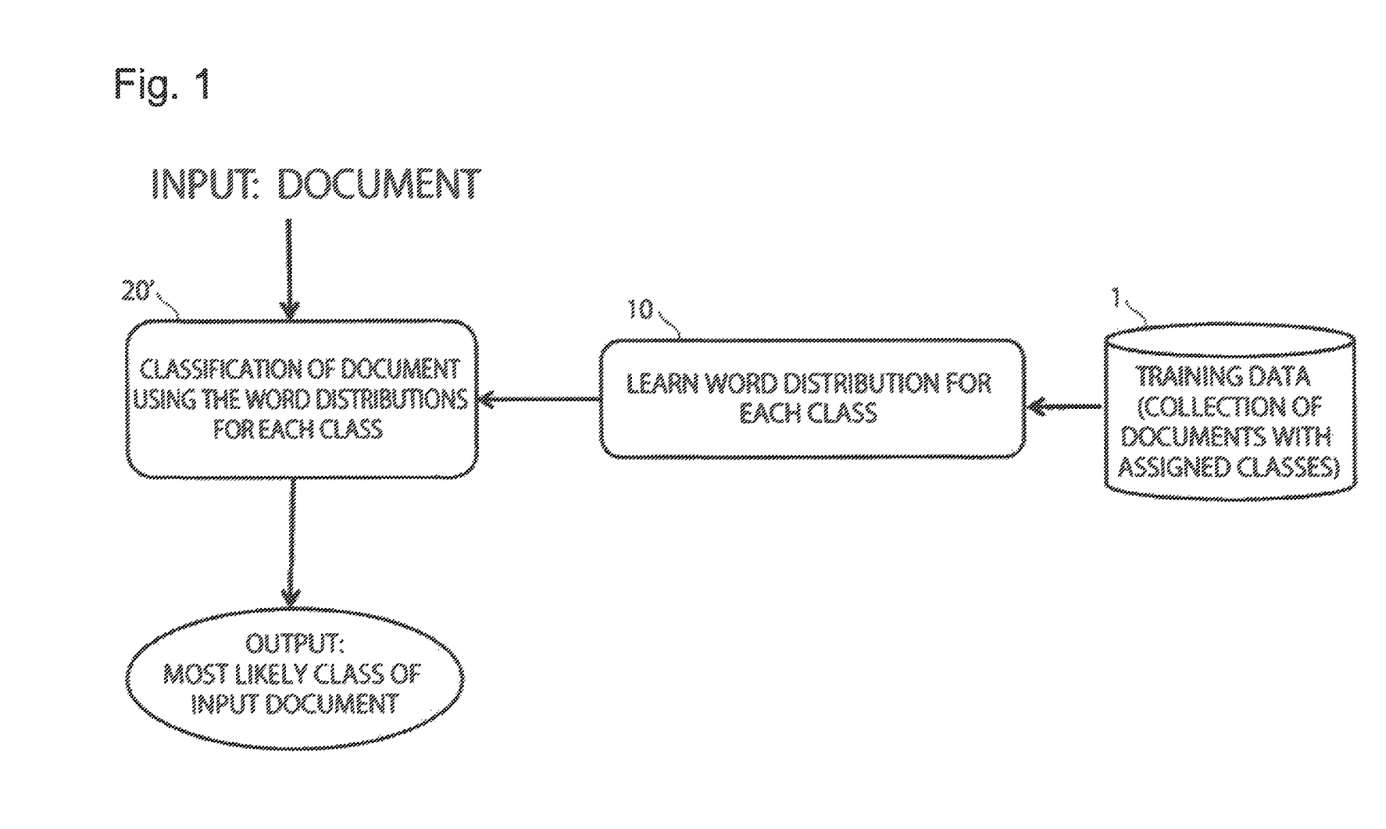
FIG. 1 is a block diagram for the naive Bayes model.
Figure 2:
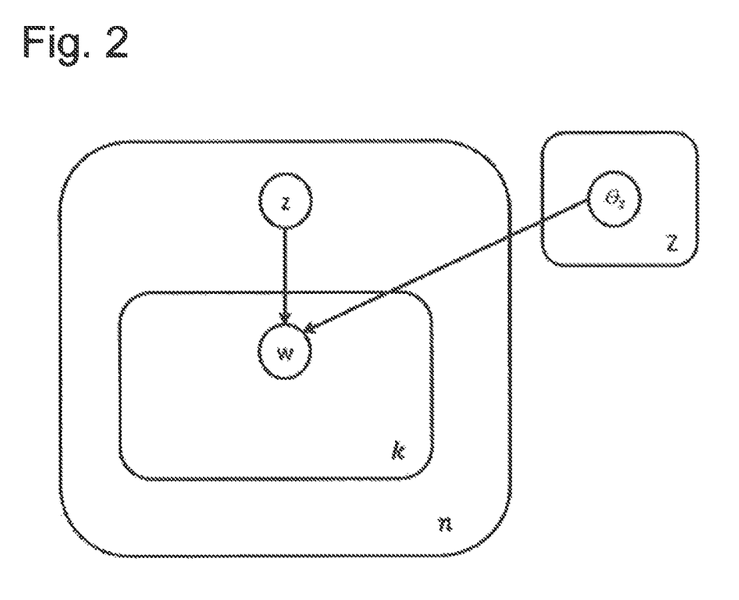
FIG. 2 shows the naive Bayes model in plate notation.

We demonstrate the proposed idea by extending the naive Bayes classifier for text classification. Given the class z of a document, we assume that each word in the document is independently generated from a distribution $\theta_z$. A popular choice for this distribution is the categorical distribution (=multinomial distribution for one word occurrence). Using the plate notation, we depict the model in FIG. 2. The block diagram is shown in FIG. 1. Let us denote a document as $(w_1, \ldots, w_k)$ where $w_j$ is the word in the j-th position of the document. Under this model, the joint probability of the document with class z is $$p(w_1, \ldots, w_k, z \mid \theta_z) = p(z) \cdot \prod_{j=1}^{k} \theta_{w_j \mid z}$$

Where $\theta_z$ is the parameter vector of the categorical distribution, with $\Sigma_w \theta_{w \mid z} = 1$; and p(z) is the prior probability of class z. Accordingly, we have $$p(w_1, \ldots, w_k \mid z, \theta_z) = \prod_{j=1}^{k} \theta_{w_j \mid z}$$

Let us denote by $\theta$ the parameter vectors $\theta_z$, for all classes z. Given a collection of texts $D = \{(t_1, z_1), \ldots, (t_n, z_n)\}$ with known classes, stored in a non-transitory computer storage medium such as a hard disk drive and a semiconductor memory 1 in FIG. 1, we can estimate the parameters $\theta_z$ by, $$\operatorname*{argmax}_{\theta} p(\theta \mid D) = \operatorname*{argmax}_{\theta} p(\theta) \cdot p(D \mid \theta)$$
$$= \operatorname*{argmax}_{\theta} p(\theta) \cdot \prod_{i=1}^{n} p(t_i, z_i \mid \theta)$$
$$= \operatorname*{argmax}_{\theta} p(\theta) \cdot \prod_{i=1}^{n} p(t_i \mid z_i, \theta)$$

using the usual iid-assumption, and that $z_i$ is independent from $\theta$. Furthermore, using Equation (1), we get, in a block 10, in FIG. 1, $$\operatorname*{argmax}_{\theta} p(\theta \mid D) = \operatorname*{argmax}_{\theta} p(\theta) \cdot \prod_{i=1}^{n} \prod_{j=1}^{k} \theta_{w_j \mid z}$$

For simplicity, let us assume that $p(\theta)$ is constant, then the above expression is maximized by $$\theta_{w \mid z} = \frac{freq_z(w)}{\sum_{w'} freq_z(w')} \quad (1)$$

where $freq_z(w)$ is the number of time word w occurs in the collection of documents that have class z. The prior probability p(z) can be estimated in a similar way, and is constant if the amount of training documents per class is the same for all classes.

For classifying a new document in a block 20' in FIG. 1, the naive Bayes classifier uses $$\operatorname*{argmax}_{z} p(z \mid w_1, \ldots, w_k) = \operatorname*{argmax}_{z} p(z) \cdot \prod_{i=1}^{k} \theta_{w_i \mid z}$$

Let consider a concrete example. Assume that we have two classes, with 5 instances each. For example, 5 documents that are about animals (short, z=A), and 5 documents that are about computer (short, z=C). For simplicity, we assume that each document has two words. Let us assume that the word "I" occurs 3 times, and 2 times, in documents that belong to class "Animal", and class "Computer", respectively. Therefore, the probability that word "I" occurs in a document belonging to class "Animal" is 3/10, and the probability that it belongs to class "Computer" is 2/10. Analogously, assume that the word "mouse" occurs 2 times, and 3 times in documents in documents that belong to class "Animal", and class "Computer", respectively. To summarize we have the following maximum-likelihood (ML) estimates:

$$p(z = A) = p(z = C) = \frac{5}{10}$$
$$p(\text{``I''} \mid z = A) = \frac{3}{10}$$
$$p(\text{``I''} \mid z = C) = \frac{2}{10}$$
$$p(\text{``mouse''} \mid z = A) = \frac{2}{10}$$
$$p(\text{``mouse''} \mid z = C) = \frac{3}{10}$$

Let us now consider a new document that contains the two words "I" and "mouse". The class for the new document is decided by considering the ratio $$\frac{p(z = A \mid \text{``I''}, \text{``mouse''})}{p(z = C \mid \text{``I''}, \text{``mouse''})}$$

If this ratio is larger than 1, then the document is classified as "Animal", if it is smaller than 1 it is classified as "Computer". Using the naive Bayes classifier, this can be we written as follows $$\frac{p(z = A \mid \text{``I''}, \text{``mouse''})}{p(z = C \mid \text{``I''}, \text{``mouse''})} = \frac{p(z = A) \cdot p(\text{``I''} \mid z = A) \cdot p(\text{``mouse''} \mid z = A)}{p(z = C) \cdot p(\text{``I''} \mid z = C) \cdot p(\text{``mouse''} \mid z = C)}$$
$$= 1.0$$

Therefore, we see that naive Bayes classifier is not able to distinguish between the two classes. However, in general, by inspecting a large collection of documents, we know that the word "I" is a high frequent word that is not very informative, that is the word is of little help for document classification. In contrast the word "mouse" is a more specific word, and can in general better help to distinguish between two classes. As a consequence, the word "mouse" should have a (slightly) more weight for deciding the class, and therefore, the document with the words "I" and "mouse" should be classified as "Computer", rather than "Animal".

Figure 3:
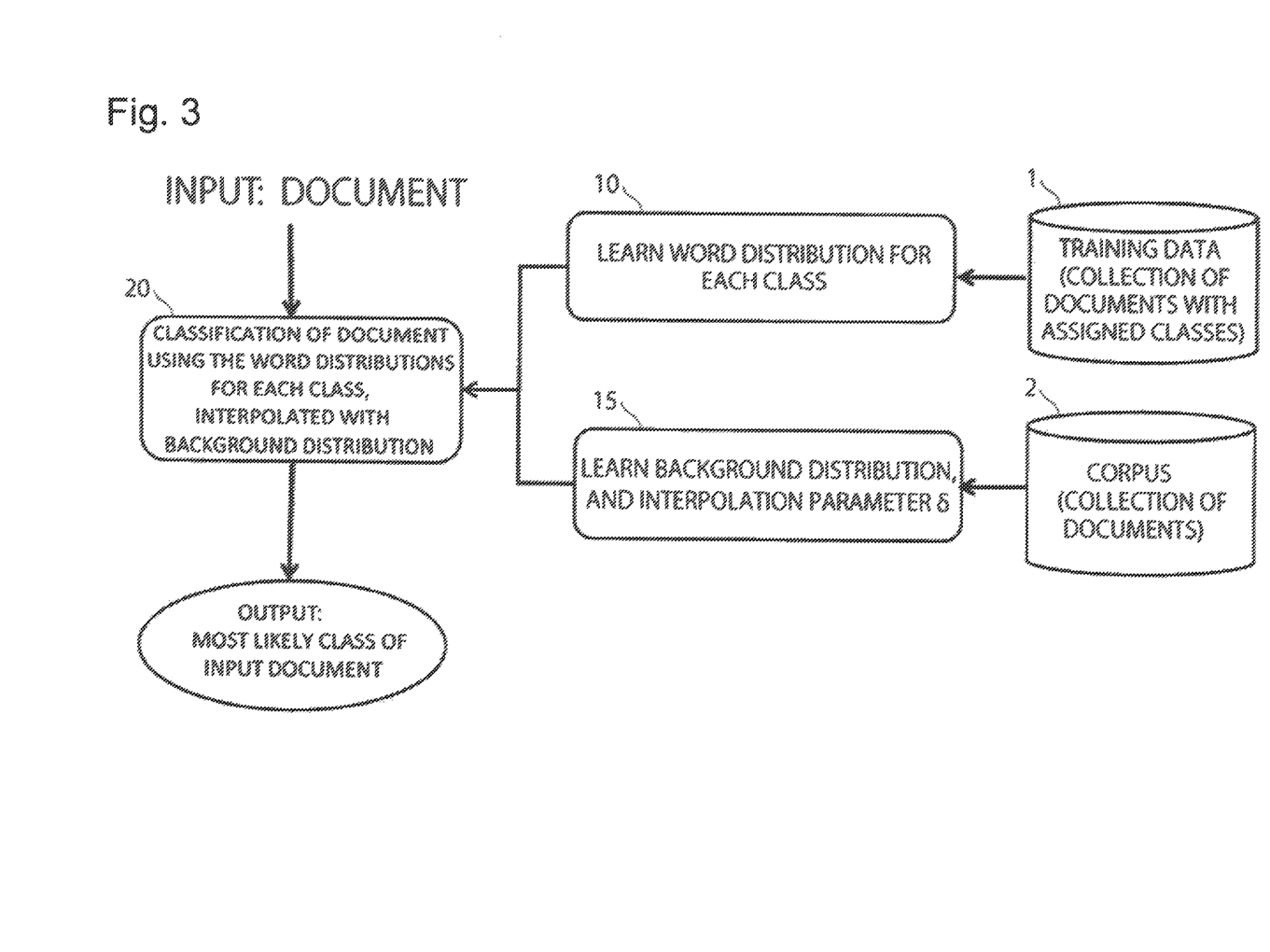
FIG. 3 is a block diagram showing an exemplary embodiment of the present invention.
Figure 4:
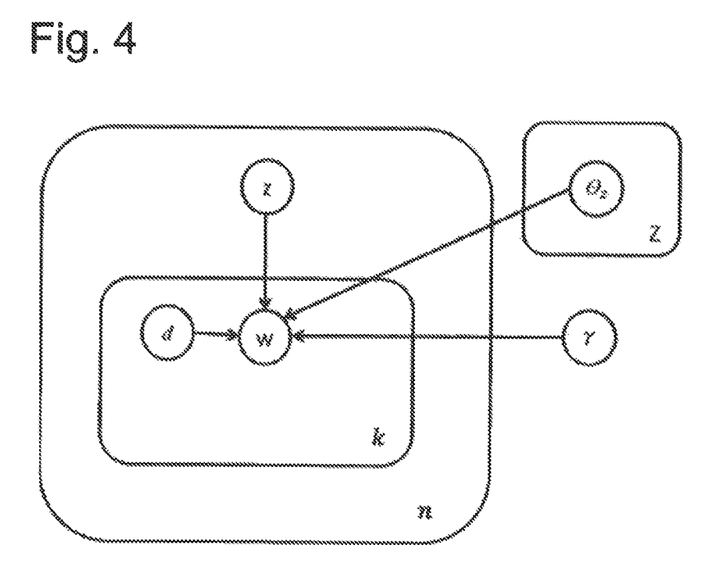
FIG. 4 shows the exemplary embodiment (extension of the naive Bayes model) in plate notation.

We now describe our extension of the naive Bayes model, displayed in FIG. 4 and FIG. 3.

FIG. 3 shows a system, usually performed by a computer system, for classifying a new data instance, such as a text document. In FIG. 3, a word distribution learning block 10 learns word distributions for each class using training data (collection of documents with assigned classes) stored in a non-transitory computer storage medium 1 such as a hard disk drive and a semiconductor memory similar to the conventional system. Further, in this exemplary embodiment, a background distribution and interpolation parameter learning block 15 learns background distributions and interpolation parameters using corpus (collection of documents) stored in a computer storage medium 2 such as a hard disk drive and a semiconductor memory. A classification block 20 is provided with a new document as a new instance, and classifies the document using the word distributions for each class and interpolated with background distribution provided from the blocks 10 and 15, respectively. The classification block 20 then outputs most likely class of input document as a classification result.

More specifically, under the proposed model, the joint probability of the text document with words $w_1, \ldots, w_k$, hidden variables $d_1, \ldots, d_k$ and class z is $$p(w_1, \ldots, w_k, d_1, \ldots, d_k, z) = p(z) \cdot \prod_{j=1}^{k} p(w_j | z, d_j) \cdot p(d_j)$$

where the word probability p(w|z, d) is defined as follows:

$$p(w | z, d) = \begin{cases} \theta_{w|z} & \text{if } d = 1 \\ \gamma_w & \text{if } d = 0 \end{cases}$$

The variables $d_j$ are binary random variables that indicate whether the word $w_j$ is drawn from the class's word distribution $\theta_z$ or from the background distribution $\gamma$. The variables dj are hidden variables which cannot be observed from the training documents. To acquire the probability of a training document $(w_1, \ldots, w_k, z)$, we integrate over all $d_1, \ldots, d_k$, leading to $$p(w_1, \ldots, w_k, z) = \sum_{d_1, \ldots, d_k} p(z) \cdot \prod_{j=1}^{k} p(w_j | z, d_j) \cdot p(d_j)$$

$$= p(z) \cdot \prod_{j=1}^{k} \sum_{d_j} p(w_j | z, d_j) \cdot p(d_j)$$

We assume, that the prior probability $p(d_j)$ is independent from the class of the document, and independent from the word position j. Therefore, we define $\delta := p(d_j=1)$, which is constant for all words. This way the joint probability of the document with class z can be expressed as follows $$p(w_1, \ldots, w_k, z) = p(z) \cdot \prod_{j=1}^{k} \left( p(d_j = 0) \cdot \gamma_{w_j} + p(d_j = 1) \cdot \theta_{w_j | z} \right)$$

$$= p(z) \cdot \prod_{j=1}^{k} \left( (1 - \delta) \cdot \gamma_{w_j} + \delta \cdot \theta_{w_j | z} \right)$$

For a class z, the word distribution $\theta_{w|z}$ can be estimated as before using Equation (1). For estimating the background distribution $\gamma$ and the prior probability $\delta$ in a block 15 in FIG. 3 we use additionally a collection of text documents for which the class is not known, stored in a non-transitory computer storage medium 2 in FIG. 3. Such text documents are often available at large quantities. For example, for spam detection, we might have a few hundred documents for which the label "spam" or "ham" is manually annotated, but thousands of emails that were not labeled. Let $D^* = \{t_1, \ldots, t_n^*\}$ be the collection of all documents. (It also includes also the documents for which class label is available. Alternatively, D* is the collection of only the documents for which no class information is available.) We estimate $\gamma_w$ by using the word distribution in D*, that is $$\gamma_w = \frac{freq_{D^*}(w)}{\sum_{w'} freq_{D^*}(w')} \quad (2)$$

where $freq_D^*(w)$ is the frequency of word w in D*. (For example, if D* contains two documents, where in the first document word w occurs 3 times, and in the second document it occurs 2 times, then $freq_{D^*}(w)$ equals 5.)

The parameter delta can also be learned using D*, as we show later, or can be set manually to a value between]0, 1]. Note that, if delta is 1, the model reduces to the original naive Bayes classifier.

Finally, in order to classify a new document $w_1, \ldots, w_k$ in a block 20 in FIG. 3, we use $$p(z | w_1, \ldots, w_k) \propto p(z) \cdot \prod_{i=1}^{k} (p(d_i = 0) \cdot \gamma_{w_i} + p(d_i = 1) \cdot \theta_{w_i | z})$$

To see that the proposed method can diminish the impact of high frequent words, consider the same example as before. Let us assume that we have additionally 90 documents without class information (unlabeled corpus) in the non-transitory computer storage medium 2 in FIG. 3. We assume that the word "I" occurs 20 times, and the word "mouse" occurs 10 times in the unlabled corpus. These 90 documents (unlabled corpus) together with the 10 documents (labeled corpus), for which the class is known, form the complete corpus. For a word w, the probability gamma, is estimates as follows:

$$\gamma_w = \frac{\text{number of times word } w \text{ occurs in complete corpus}}{\text{total number of words in complete corpus}}$$

and therefore we have $$\gamma_I = \frac{20 + 5}{100 * 2}$$

and $$\gamma_{mouse} = \frac{10 + 5}{100 * 2}$$

The class probabilities $\theta_{w|z}$ for the words "I" and "mouse" are set to the probabilities p(w|z) of the original naive Bayes model, i.e.:

$$\theta_{I|A} = \frac{3}{10}$$

$$\theta_{I|C} = \frac{2}{10}$$

$$\theta_{mouse|A} = \frac{2}{10}$$

$$\theta_{mouse|C} = \frac{3}{10}$$

Furthermore, for simplicity we assume that δ is set to 0.5, that means $p(d_j=1)=p(d_j=0)=0.5$, for all j. Let us now consider the document containing the two words "I" and "mouse", which class is decided by the following ratio $$\frac{p(z=A\mid\text{"I"},\text{"mouse"})}{p(z=C\mid\text{"I"},\text{"mouse"})} = \frac{(\theta_{I|A}+\gamma_I)\cdot(\theta_{mouse|A}+\gamma_{mouse})}{(\theta_{I|C}+\gamma_I)\cdot(\theta_{mouse|C}+\gamma_{mouse})}$$

$$= \frac{0.425\cdot 0.275}{0.325\cdot 0.375} \approx 0.96 < 1$$

Therefore the document is classified as a "Computer" article, which is in contrast to before using the (original) naive Bayes classifier. We can that here the weight of word "mouse" dominates the weight of word "I", which is a high frequent word. In general, high frequent word get a lower weight for deciding the class, and therefore their (negative) impact is diminished.

We note that the above example holds in more general. Consider a document that has two words a and b, and $\theta_{a|z1}=\theta_{b|z2}$, and $\theta_{a|z2}=\theta_{b|z1}$. Without loss of generality, we assume that $\theta_{a|z1}>\theta_{a|z2}$. In words, this means word a suggests class $z_1$ exactly as strong as word b suggests class $z_2$. Furthermore, let δ be in ]0,1[. Assuming that both prior probabilities of class $z_1$ and $z_2$ are the same, we can see whether the document a, b is classified as class $z_1$ or $z_2$ by inspecting the ratio:

$$\frac{(1-\delta)\cdot\gamma_a+\delta\cdot\theta_{a|z_1}}{(1-\delta)\cdot\gamma_a+\delta\cdot\theta_{a|z_2}} \cdot \frac{(1-\delta)\cdot\gamma_b+\delta\cdot\theta_{b|z_1}}{(1-\delta)\cdot\gamma_b+\delta\cdot\theta_{b|z_2}}$$

If the ratio is larger than 1, the document is classified as class $z_1$, if the ratio is smaller than 1 the document is classified as class $z_2$. We can show that this ratio is smaller than 1, if, and only if, $\gamma_a > \gamma_b$. Therefore, if the word b is less frequent than a, the weight of word b becomes higher than the weight of word a.

As a consequence, the proposed method can have a similar effect as idf-weighting, in the sense, that it mitigates high-frequency words. Note that, a naive Bayes classifier cannot classify the document, because in that case we would be directly on the decision boundary.

Proof of the Above Statement:
To simplify notation let $$\gamma'_a := (1-\delta)\cdot\gamma_a$$

$$\gamma'_b := (1-\delta)\cdot\gamma_b$$

$$\theta'_{a|z_1} := \delta\cdot\theta_{a|z_1}$$

$$\theta'_{b|z_1} := \delta\cdot\theta_{b|z_1}$$

$$\theta'_{a|z_2} := \delta\cdot\theta_{a|z_2}$$

$$\theta'_{b|z_2} := \delta\cdot\theta_{b|z_2}$$

since $\theta_{a|z1}=\theta_{b|z2}$, and $\theta_{a|z2}=\theta_{b|z1}$, and $\theta_{a|z1}>\theta_{a|z2}$, we then have $$\frac{\gamma'_a+\theta'_{a|z_1}}{\gamma'_a+\theta'_{a|z_2}}\cdot\frac{\gamma'_b+\theta'_{b|z_1}}{\gamma'_b+\theta'_{b|z_2}} < 1 \Leftrightarrow \frac{\gamma'_a+\theta'_{a|z_1}}{\gamma'_a+\theta'_{a|z_2}}\cdot\frac{\gamma'_b+\theta'_{a|z_2}}{\gamma'_b+\theta'_{a|z_1}} < 1 \Leftrightarrow$$

$$(\gamma'_a+\theta'_{a|z_1})\cdot(\gamma'_b+\theta'_{a|z_2}) < (\gamma'_a+\theta'_{a|z_2})\cdot(\gamma'_b+\theta'_{a|z_1}) \Leftrightarrow$$

$$\gamma'_a\cdot\theta'_{a|z_2}+\gamma'_b\cdot\theta'_{b|z_1} < \gamma'_a\cdot\theta'_{a|z_1}+\gamma'_b\cdot\theta'_{a|z_2} \Leftrightarrow$$

$$\gamma'_a\cdot(\theta'_{a|z_2}-\theta'_{a|z_1}) < \gamma'_b\cdot(\theta'_{a|z_2}-\theta'_{b|z_1}) \Leftrightarrow \gamma'_a > \gamma'_b \Leftrightarrow \gamma_a > \gamma_b$$

It is not difficult to see that the parameter δ controls how much the impact of high frequent words is reduced. We will now show that the parameter can be learned from the corpus D*. We suggest to set δ such that if there are many high-frequent words in D* that cannot be explained by any $\theta_z$, the parameter δ is closer to 0. We can achieve this by choosing the parameter δ* that maximizes $p(D^*)$ under our proposed model for fixed parameters $\theta_z$ and γ.

This means $$\delta^* := \underset{\delta}{\arg\max}\, p(D^*) \qquad (3)$$

$$= \underset{\delta}{\arg\max} \prod_{i=1}^{n^*} \sum_{z_i} p(z_i) \cdot \prod_{j=1}^{k_i} \left((1-\delta)\cdot\gamma_{w_j} + \delta\cdot\theta_{w_j|z}\right)$$

To find an approximate solution to this problem we can, for example, use the EM-algorithm, considering all class labels zi and all indicator variables $d_j$ as unobserved.

We note that, in the same way as δ, it also possible to estimate γ instead of setting it to the word frequency distribution (as in Equation (2)). In doing so, for high-frequent words w that can be well explained by a class z, i.e. $\theta_{w|z}$ is high, the probability $\gamma_w$ is reduced. This has the advantage, that such high-frequent words w remain to have a high weight that favors class z.

For simplicity, in this example, we set the probability $\theta_{w|z}$ and the probability $\gamma_w$ to the categorical distribution (or multinomial distribution without the combinatorial factor for the word frequency). However, in practice for modelling text it is advantageous to use instead a mixture distribution model, most notably a mixture of multinomial distributions like in Non-Patent Document 2. The number of components can be determined using cross-validation, and the word probabilities for each component can be learned, for example, using the EM algorithm from labeled and unlabeled data. It is also possible to assume an infinite mixture model, by placing a Dirichlet process prior over the number of components. In that case, the probabilities $\theta_{w|z}$ and the probability $\gamma_w$ can be estimated using Markov-Chain-Monte Carlo (MCMC) methods.

As an alternative to Equation (3), we can set the interpolation parameter δ such that the expected document classification accuracy is optimized. This can be achieved by using cross-validation on the training data instances with class information (i.e. labeled data).

The method for classifying a new data instance, such as a text document of the above exemplary embodiments may be realized by dedicated hardware, or may be configured by means of memory and a DSP (digital signal processor) or other computation and processing device. On the other hand, the functions may be realized by execution of a program used to realize the steps of the method for classifying a new data instance, such as a text document.

Moreover, a program to realize the steps of the method for classifying a new data instance, such as a text document, may be recorded on computer-readable storage media, and the program recorded on this storage media may be read and executed by a computer system to perform the method for classifying a new data instance, such as a text document, processing. Here, a "computer system" may include an OS, peripheral equipment, or other hardware.

Further, "computer-readable storage media" means a flexible disk, magneto-optical disc, ROM, flash memory or other writable nonvolatile memory, CD-ROM or other removable media, or a hard disk or other storage system incorporated within a computer system.

Further, "computer readable storage media" also includes members which hold the program for a fixed length of time, such as volatile memory (for example, DRAM (dynamic random access memory)) within a computer system serving as a server or client, when the program is transmitted via the Internet, other networks, telephone circuits, or other communication circuits.

For convenience, we use the term "word" to describe a feature in the present specification and claims below. However, we note that the method can also be applied for other features that are not lexical.

INDUSTRIAL APPLICABILITY

The present invention allows to classify an input text with a naive Bayes classifier without previous feature selection that removes high frequent words (like stop-words) that are uninformative. Feature selection is known to improve the performance of a classifier, since it removes noise. However, feature selection needs to be done partly manually, involving additional costs. The present invention allows to automatically determine how to diminish the impact of high frequent words' noise by learning word distributions from unlabeled text. That means, no parameters need to be manually tuned, and no additional manually labeled training data is necessary. The present invention is formulated as extension of the generative process of the naive Bayes classifier, which allows it to be easily extended to model more complex interaction of words, or to model words and additional other types of attributes (e.g. for spam detection, the actual email text+additional attributes like number of times email from same sender was removed.). As a consequence the present invention allows high text classification accuracy, without additional costs.

The invention claimed is:

1. A method for classifying a new instance including a text document by using a collection of training instances with known class including labeled data and zero or more training instances with unknown class including unlabeled data, comprising:
estimating a word distribution for each class by using the labeled data and the unlabeled data;
estimating a background distribution, and a degree of interpolation between the background distribution and the word distribution by using the labeled data and the unlabeled data;
calculating, for each word of the new instance, a first probability for that the word is generated from the word distribution and a second probability for that the word is generated from the background distribution;
combining the first probability with the second probability by using the interpolation;
combining the resulting probabilities of all words to estimate a document probability, for the class, that indicates the document and is generated from the class; and
classifying the new instance as a class for which the document probability is the highest.

2. The method according to claim 1, wherein
in estimating the background distribution, estimating the background distribution such that a probability of observing the collection of all of the training instances with the known class and the unknown class is maximized.

3. The method according to claim 1, wherein
the background distribution is set to a word frequency distribution as observed in all instances with the known class and the unknown class.

4. The method according to claim 1, wherein
the interpolation parameter is set such that an expected document classification accuracy is optimized.

5. The method according to claim 1, wherein
the word distribution for each class and/or the background distribution is set to a multinomial distribution or a mixture of multinomial distributions, and is estimated by using the labeled data or by using both of the labeled data and the unlabeled data.

* * * * *